(12) United States Patent
Yang et al.

(10) Patent No.: US 7,173,675 B2
(45) Date of Patent: Feb. 6, 2007

(54) LCD DISPLAY WITH CONTACT HOLE AND INSULATION LAYER ABOVE PIXEL ELECTRODE

(75) Inventors: Joon Young Yang, Kyonggi-do (KR); Sang Min Jang, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/844,346

(22) Filed: May 13, 2004

(65) Prior Publication Data

US 2004/0252250 A1   Dec. 16, 2004

(30) Foreign Application Priority Data

Jun. 11, 2003   (KR) ............... 10-2003-0037639

(51) Int. Cl.
 *G02F 1/136* (2006.01)
(52) U.S. Cl. .................... 349/43; 257/59; 349/138
(58) Field of Classification Search ............ 349/43, 349/47, 46; 438/546; 257/57, 59
See application file for complete search history.

(56) References Cited

U.S. PATENT DOCUMENTS

| | | | | |
|---|---|---|---|---|
| 4,411,058 | A * | 10/1983 | Chen | 438/218 |
| 6,566,178 | B2 * | 5/2003 | Shih | 438/163 |
| 6,822,293 | B2 * | 11/2004 | Yamazaki et al. | 257/347 |
| 6,927,809 | B2 * | 8/2005 | Gotoh et al. | 349/44 |
| 2003/0169380 | A1 * | 9/2003 | Arao | 349/43 |

FOREIGN PATENT DOCUMENTS

| | | |
|---|---|---|
| JP | 9-298304 | 11/1997 |
| JP | 2001-332733 | 11/2001 |

OTHER PUBLICATIONS

Office Action issued by the Korean Intellectual Property Office on Jul. 20, 2006.

* cited by examiner

*Primary Examiner*—Andrew Schechter
*Assistant Examiner*—Phu Vu
(74) *Attorney, Agent, or Firm*—McKenna Long & Aldridge LLP

(57) ABSTRACT

A liquid crystal display (LCD) device includes a substrate including a pixel region and a driving circuit region, first and second semiconductor layers within the pixel region and the driving circuit region, a gate insulating layer on the substrate, first and second gate electrodes on the gate insulating layer, and a storage capacitor electrode on the gate insulating layer within the pixel region, first conductive source and drain regions within the first semiconductor layer, second conductive source and drain regions within the second semiconductor layer, a first insulating interlayer on the substrate, a pixel electrode on the first insulating interlayer overlapping the storage capacitor electrode, a second insulating interlayer on the substrate including the pixel electrode, a plurality of contact holes exposing the pixel electrode and the first and second source and drain regions, and first and second source and drain electrodes connected with the first and second source and drain regions through the contact holes.

24 Claims, 11 Drawing Sheets

LCD DISPLAY WITH CONTACT HOLE AND INSULATION LAYER ABOVE PIXEL ELECTRODE

The present application claims the benefit of Korean Patent Application No. P2003-37639, filed in Korea on Jun. 11, 2003, which is hereby incorporated by reference.

BACKGROUND OF THE INVENTION

1. Field of the Invention

The present invention relates to a display device and a method of fabricating a display device, and more particularly, to a liquid crystal display (LCD) device and a method of manufacturing an LCD device.

2. Discussion of the Related Art

In general, an LCD device includes an LCD panel to display images and an external driving circuit to supply driving signals to the LCD panel. In addition, the LCD panel includes first and second transparent substrates (glass substrates) bonded to each other having a predetermined interval therebetween, and a liquid crystal material injected between the first and second substrates. The first substrate includes a plurality of gate and data lines crossing each other to define pixel regions, a plurality of pixel electrodes in the respective pixel regions, and a plurality of thin film transistors at respective crossing portions of the gate and data lines to supply video signals transmitted along the data lines to the respective pixel electrodes according to gate signals transmitted along the gate lines. The second substrate includes a black matrix layer that excludes transmission of light from portions of the first substrate except within the pixel regions, a red (R)/green (G)/blue (B) color filter layer for producing colored light corresponding to the respective pixel regions, and a common electrode for driving liquid crystal molecules of the liquid crystal material with the pixel electrode of the first substrate. Accordingly, as turn-ON signals are sequentially supplied to the gate lines, the data signals are supplied to the pixel electrode of the corresponding line, thereby displaying images.

In the LCD device, an active layer of the thin film transistor is formed of dehydrogenated amorphous silicon (a-Si), since the dehydrogenated a-Si may be used for fabricating the glass substrate during low-temperature processes. However, since the dehydrogenated a-Si has both weak Si—Si bonds and dangling bond due to its disordered atomic arrangement, use of the dehydrogenated a-Si may cause instability when driving the LCD device during light irradiation and induction of an electric field to the liquid crystal material. Specifically, since the a-Si has a low field effect mobility of 0.1 $cm^2/Vs$ to 1.0 $cm^2/Vs$ and decreased reliability, the a-Si is not appropriate for driving circuitry of an LCD device. Accordingly, the driving circuit is formed on an additional printed circuit board (PCB) substrate instead of the first substrate, wherein the first substrate and the PCB substrate are connected with each other by using a tape carrier package (TCP) and an integrated circuit (IC), thereby increasing manufacturing costs of the LCD device. In addition, as resolution of the LCD panel of the LCD device increases, external pad pitch increases. Thus, it is difficult to perform the TCP bonding process due for connecting the gate and data lines to the TCP.

However, polysilicon has a field effect mobility higher than that of the amorphous silicon a-Si, and is commonly used for the driving circuitry of the LCD device. Accordingly, it is possible to both simplify manufacturing process and decrease manufacturing costs. Since the polysilicon thin film transistor (TFT) has greater electron/hole mobilities than the a-Si TFT, the polysilicon TFT may be configured as a complementary metal-oxide semiconductor (CMOS) TFT. Thus, instead of bonding the driving circuit IC onto a separate substrate, polysilicon structures used for the driving circuitry are formed on the substrate such that the driving circuitry is formed simultaneously with the TFT of a pixel part. Currently, it is possible to form the polysilicon TFT at temperatures similar to that of the a-Si TFT using laser crystallization methods.

Figure 1:
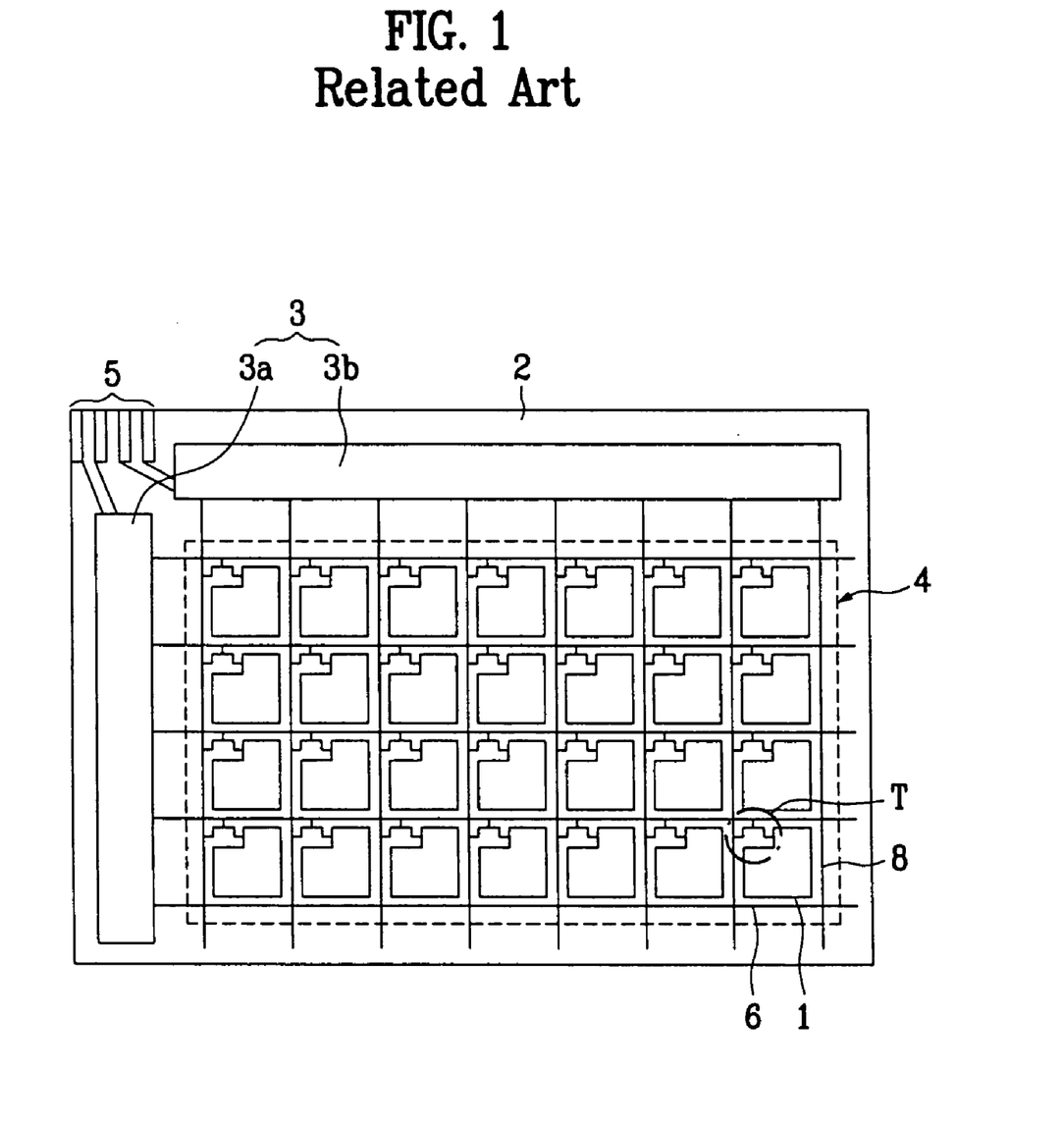
FIG. 1 is a block diagram of a polysilicon LCD device according to the related art.

FIG. 1 is a block diagram of a polysilicon LCD device according to the related art. In FIG. 1, a polysilicon LCD device includes a pixel part 4 and a driving circuit part 3 formed on a second substrate 2. The pixel part 4 includes a plurality of gate lines 6 arranged on the second substrate 2 along a first direction and a plurality of data lines 6 arranged along a second direction perpendicular to the first direction, thereby forming a plurality of pixel region in a matrix-type configuration. The driving circuit part 3 is formed on the second substrate 2 to provide driving and data signals to the pixel part 4. Accordingly, a pixel electrode 1 and a TFT T are formed within the pixel region at a crossing portion of the gate and data lines 6 and 8. Thus, gate and data drivers 3a and 3b of the driving circuit part 3 provide control and data signals to the pixel electrode 1 of the pixel region through the gate and data lines 6 and 8. When turn-ON signals are sequentially supplied to the gate line 6, the data signals are supplied to the pixel electrode 1 of the corresponding gate line, thereby displaying images. The gate and data drivers 3a and 3b are connected using an external signal input terminal 5, wherein the gate and data drivers 3a and 3b control external signals input through the external signal input terminal 5, and output the controlled external signals to the pixel electrode 1. In addition, the gate and data drivers 3a and 3b make use of CMOS TFTs (not shown) as an inverter for outputting the signals.

Figure 2A:
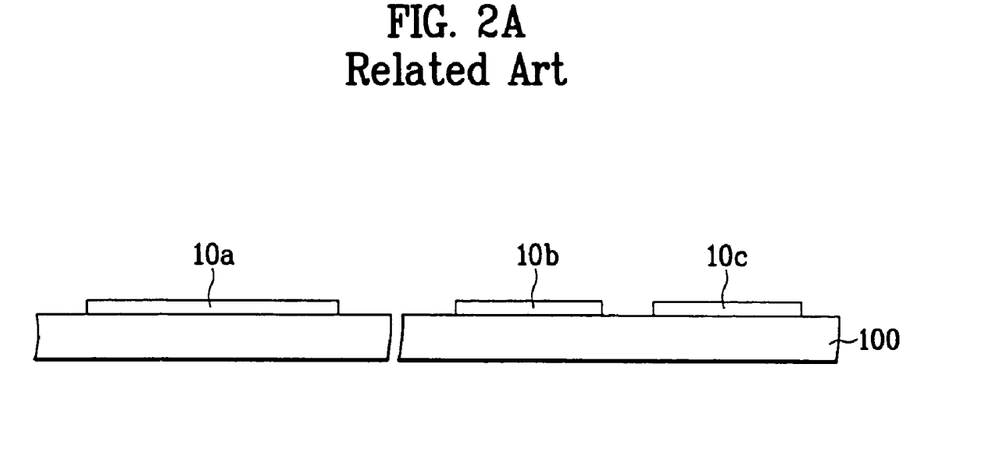
FIGS. 2A to 2H are cross sectional views of manufacturing process steps of an LCD device according to the related art.

FIGS. 2A to 2H are cross sectional views of manufacturing process steps of an LCD device according to the related art. In FIG. 2A, a polysilicon layer is deposited along an entire surface of a substrate 100 having a pixel part and a driving circuit part. Then, the polysilicon layer is selectively patterned by photolithographic processes, thereby forming first, second, and third semiconductor layers 10a, 10b, and 10c at the pixel part and the driving circuit part (the first mask).

Figure 2B:
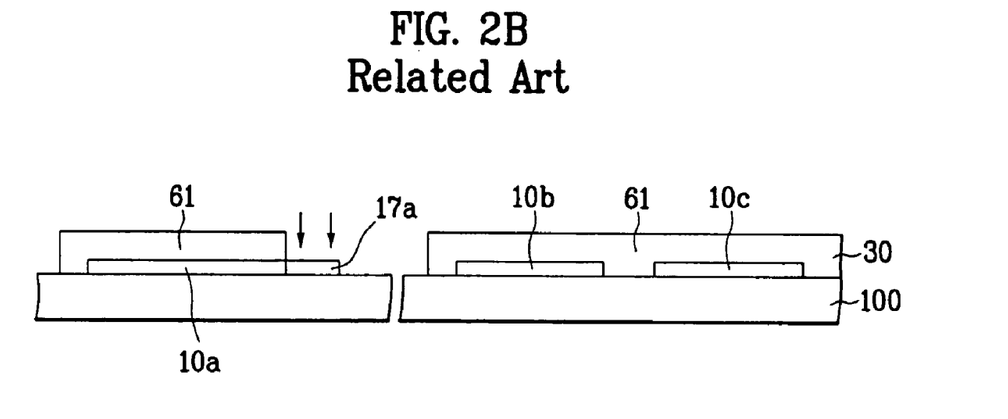

In FIG. 2B, impurity ions are implanted into a predetermined portion of the semiconductor layer 10a at the pixel part, thereby forming a first storage capacitor electrode 17a. When the first semiconductor layer 10a of the pixel part is formed of n-type material, a first photoresist 61 is deposited along an entire surface of the substrate 100, and only a portion corresponding to the first storage capacitor electrode 17 is exposed by photolithographic processes. Then, n-type impurity ions are selectively implanted into a portion of the first storage capacitor electrode 17a, thereby forming a conductive portion (the second mask).

Figure 2C:
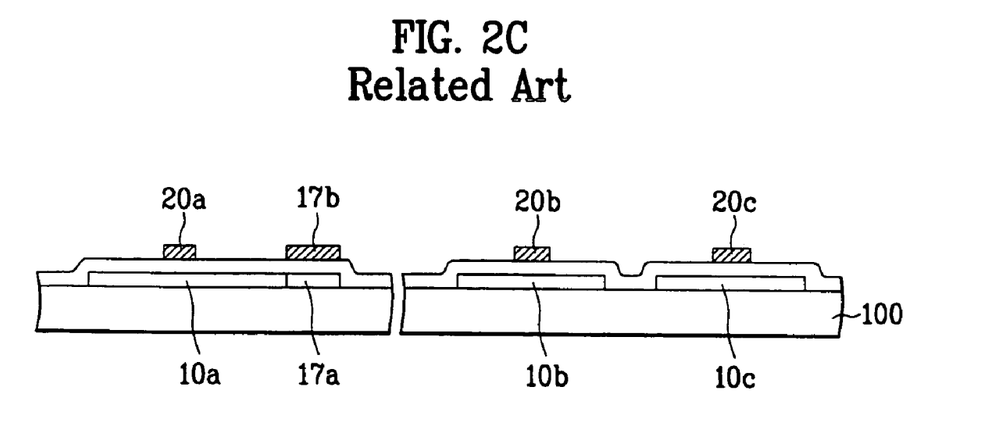

In FIG. 2C, after removing the first photoresist 61, a heat treatment or a laser irradiation is performed thereto to activate the n-type impurity ions. Then, an insulating material, such as silicon oxide or silicon nitride, is coated along an entire surface of the substrate 100, thereby forming a gate insulating layer 30. Next, a metal layer (not shown) of Al, Al alloy, or Cr is coated along an entire surface of the substrate 100 including the gate insulating layer 30 (in FIG. 2B). Then, the metal layer (not shown) is selectively patterned by photolithographic processes, thereby forming first, second, and third gate electrodes 20a, 20b, and 20c on the gate insulating layer 30 corresponding to the first, second, and third semiconductor layers 10a, 10b, and 10c. In addition, a second storage capacitor electrode 17b is formed on the first storage capacitor electrode 17a (the third mask). When patterning the metal layers, the metal layer for each of the first, second, and third gate electrodes 20a, 20b, and 20c is patterned to be positioned in middle portion of each of the first, second, and third semiconductor layers 10a, 10b, and 10c. In addition, the metal layer for the second storage capacitor electrode 17b is formed to completely cover the first storage capacitor electrode 17.

Figure 2D:
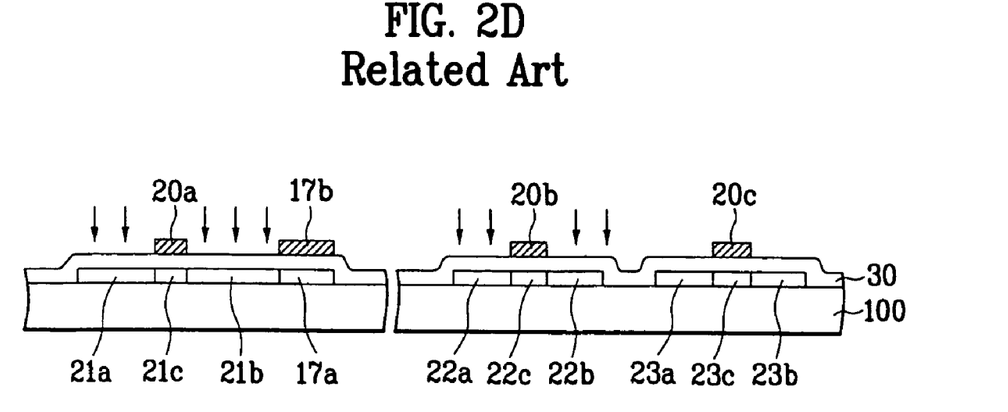

In FIG. 2D, lightly doped n-type impurity ions are implanted into an entire surface of the substrate 100 by using the first, second, and third gate electrodes 20a, 20b, and 20c and the second storage capacitor electrode 17b as a mask, thereby forming LDD regions 21a, 21b, 22a, 22b, 23a, and 23b in the first, second, and third semiconductor layers 10a, 10b and 10c. In addition, channel regions 21c, 22c, and 23c are formed in the first, second, and third semiconductor layers 10a, 10b, and 10c corresponding to the gate electrodes 20a, 20b, and 20c, respectively.

Figure 2E:
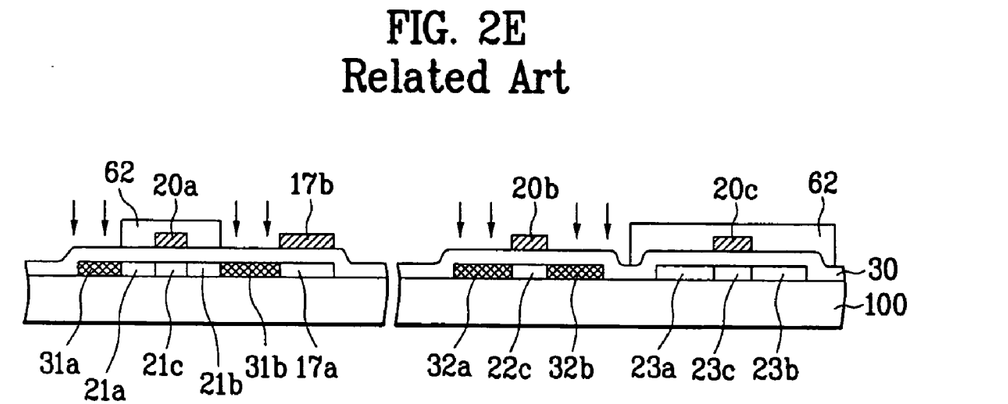

In FIG. 2E, a second photoresist 62 is deposited along an entire surface of the substrate 100 including the LDD regions 21a, 21b, 22a, 22b, 23a, and 23b. Then, the second photoresist 62 is patterned by photolithographic processes to remain as a shape for covering the LDD regions 21a and 21b of the first semiconductor layer 10a corresponding to both sides of the first gate electrode 20a and the third semiconductor layer 10c. Next, heavily doped n-type impurity ions are implanted into the first and second semiconductor layers 10a and 10b by using the patterned second photoresist 62 as a mask, whereby first source/drain regions 31a/31b are formed in the exposed portions of the first semiconductor layer 10a, and nMOS-type second source/drain regions 32a/32b are formed in the exposed portions of the second semiconductor layer 10b (the fourth mask).

Figure 2F:
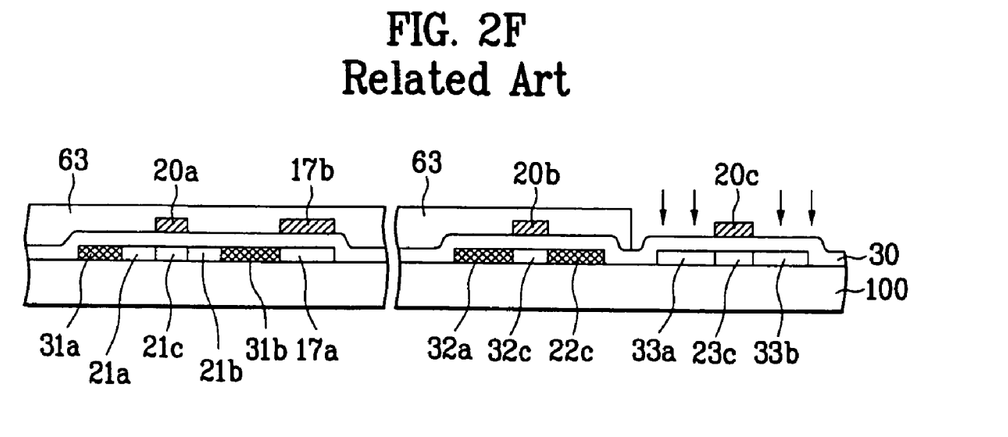

In FIG. 2F, after removing the second photolithography 62, a third photoresist 63 is deposited, and then patterned to cover an entire surface of the substrate 100, except for the third semiconductor layer 10c, by photolithographic processes. Then, heavily doped p-type impurity ions are implanted into the third semiconductor layer 10c by using the patterned third photoresist 63 as a mask, thereby forming pMOS-type third source/drain regions 33a/33b (the fifth mask).

The aforementioned doping method is commonly referred to as counter doping. When implanting the lightly doped n-type impurity ions, an ionization concentration of the impurity ions for the third semiconductor layer 10c is about $10^{14}/cm^3$. In addition, when implanting the heavily doped p-type impurity ions, an ionization concentration of the impurity ions for the third semiconductor layer 10c is about $10^{18}/cm^3$. By implanting the heavily doped p-type impurity ions, the region of the lightly doped n-type impurity ions is changed to the region of the heavily doped p-type impurity ions.

After completing the impurity ion implanting process, the pixel part has the first semiconductor layer 10a including the first source/drain regions 31a/31b to which the heavily doped n-type impurity ions are implanted, and the LDD region 31d to which the lightly doped n-type impurity ions are implanted, and the channel region 23c. In addition, the driving part has the second semiconductor layer 10b and the third semiconductor layer 10c. Accordingly, the second semiconductor layer 10b includes the second source and drain regions 32a and 32b to which the heavily doped n-type impurity ions are implanted, and the channel region 22c.

Similarly, the third semiconductor layer 10c includes the third source and drain regions 33a and 33b to which the heavily doped p-type impurity ions are implanted, and the channel region 23c.

Figure 2G:
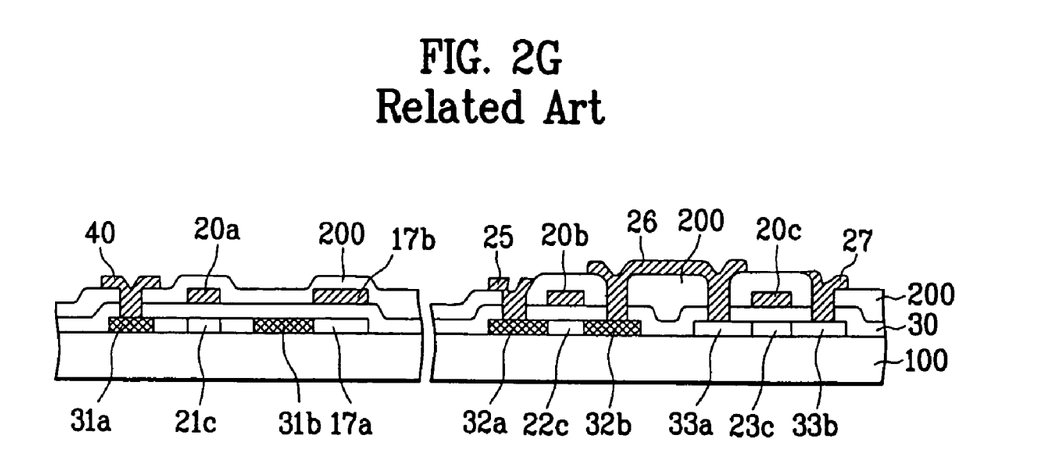

In FIG. 2G, the third photoresist 63 is removed, and then an insulating interlayer 200 is formed by depositing an insulating layer, such as silicon nitride, along an entire surface of the substrate 100. Then, the insulating interlayer 200 is selectively patterned by photolithographic processes, thereby forming a first contact hole for exposing the first source region 31a of the first semiconductor layer 10a, the second source and drain regions 32a and 32b of the second semiconductor layer 10b, and the third source/drain regions 33a and 33b of the third semiconductor layer 10c (the sixth mask). Next, a metal material, such as Al, is deposited along an entire surface of the substrate 100, and then selectively patterned by photolithographic processes, thereby forming a data line (not shown) of the first semiconductor layer 10a, a first source electrode 40 projecting from the data line, second source and drain electrodes 25 and 26 of the second semiconductor layer 10b, and third source and drain electrodes 26 and 27 of the third semiconductor layer 10c. In addition, the second drain region 32b is electrically connected with the third source region 33a.

Figure 2H:
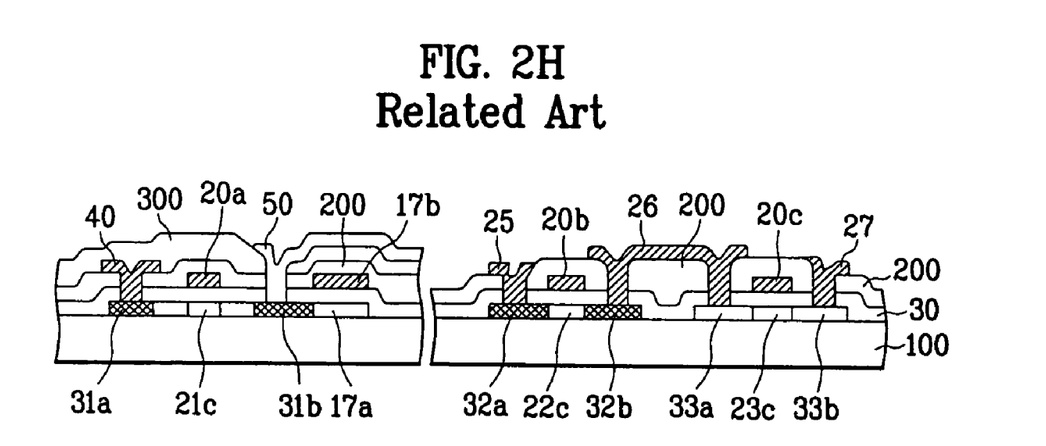

In FIG. 2H, a passivation layer 300 is formed by depositing an insulating material along an entire surface of the substrate 100. Then, the gate insulating layer 30, the insulating layer 200, and the passivation layer 300 corresponding to the first drain region 31b of the first semiconductor layer 10a are selectively removed by photolithographic processes, thereby forming a second contact hole for exposing the first drain region 31b of the first semiconductor layer 10a (the eighth mask). Next, an indium-tin-oxide (ITO) layer is deposited along an entire surface of the substrate 100 including the second contact hole, and then selectively patterned by photolithographic processes, thereby forming a pixel electrode 50 (the ninth mask). Accordingly, in the pixel part, the n-type TFT including the first semiconductor layer 10a doped as the n-type and the first gate electrode 20a is formed. In addition, in the driving circuit part, the CMOS TFT is formed, wherein the CMOS TFT includes the n-type TFT having the second semiconductor layer 10b doped as the n-type and the second gate electrode 20b, and the p-type TFT having the third semiconductor layer 10c doped as the p-type and the third gate electrode 20c.

However, the method of manufacturing the LCD device according to the related art has the following disadvantages. During the process of forming the storage capacitor, an additional mask is required for implanting the impurity ions into the first storage capacitor electrode. In addition, when patterning the n-type TFT and the p-type TFT of the driving circuit part, two masks are required for implanting the n-type and p-type impurity ions into the respective semiconductor layers for the TFT. Accordingly, as the number of masks increases, manufacturing costs increase, thereby lowering productivity and yield.

SUMMARY OF THE INVENTION

Accordingly, the present invention is directed to an LCD device and a method of manufacturing an LCD device that substantially obviates one or more problems due to limitations and disadvantages of the related art.

An object of the present invention is to provide an LCD device manufactured using a reduced number of masks.

Another object of the present invention is to provide a method of manufacturing an LCD device using a counter-doping method with a photoresist.

Additional features and advantages of the invention will be set forth in the description which follows, and in part will become apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display (LCD) device includes a substrate including a pixel region and a driving circuit region, first and second semiconductor layers disposed within the pixel region and the driving circuit region of the substrate, a gate insulating layer disposed along an entire surface of the substrate including the first and second semiconductor layers, first and second gate electrodes disposed on the gate insulating layer corresponding to the first and second semiconductor layers, and a storage capacitor electrode on the gate insulating layer within the pixel region, first conductive source and drain regions each having LDD structures within the first semiconductor layer corresponding to opposing sides of the first gate electrode, second conductive source and drain regions within the second semiconductor layer corresponding to opposing sides of the second gate electrode, a first insulating interlayer disposed along an entire surface of the substrate including the first and second gate electrodes and the storage capacitor electrode, a pixel electrode disposed on the first insulating interlayer within the pixel region, and being overlapped with the storage capacitor electrode, a second insulating interlayer disposed along an entire surface of the substrate including the pixel electrode, a plurality of contact holes exposing a portion the pixel electrode and portions of the first and second source and drain regions, and first and second source and drain electrodes connected with the first and second source and drain regions through the contact holes.

In another aspect, a liquid crystal display (LCD) device includes a substrate having a pixel region and a driving circuit region, a first semiconductor layer within the pixel region of the substrate, and second and third semiconductor layers within the driving circuit region of the substrate, a gate insulating layer disposed along an entire surface of the substrate including the first, second, and third semiconductor layers, first, second, and third gate electrodes on the gate insulating layer corresponding to the first, second, and third semiconductor layers, and a storage capacitor electrode on the gate insulating layer within the pixel region, first and second source and drain regions of a first conductive type each having LDD structures within the first and second semiconductor layers corresponding to opposing sides of the respective first and second gate electrodes, third conductive source and drain regions of a second conductive type within the third semiconductor layer corresponding to opposing sides of the third gate electrode, a first insulating interlayer disposed along an entire surface of the substrate including the first, second, and third gate electrodes and the storage capacitor electrode, a pixel electrode disposed on the first insulating interlayer within the pixel region to be overlapped with the storage capacitor electrode, a second insulating interlayer disposed along an entire surface of the substrate including the pixel electrode, a plurality of contact holes exposing a portion of the pixel electrode and portions of the first, second, and third source and drain regions, and first, second, and third source and drain electrodes connected with the first, second, and third source and drain regions through the contact holes.

In another aspect, a method for manufacturing a liquid crystal display (LCD) device includes forming first and second semiconductor layers on a substrate having a pixel region and a driving circuit region, sequentially forming a gate insulating layer, a metal layer, and a photoresist along an entire surface of the substrate including the first and second semiconductor layers, forming first and second gate electrodes on the gate insulating layer corresponding to the first and second semiconductor layers, and a storage capacitor electrode within the pixel region by patterning the photoresist and selectively removing the metal layer, ashing the patterned photoresist to reduce a width and thickness of the patterned photoresist, forming first source and drain regions within the first and second semiconductor layers by heavily implanting first conductive type impurity ions into the first and second semiconductor layers by using the first and second gate electrodes as masks, selectively removing the first and second gate electrodes and the storage capacitor electrode by using the ashed photoresist as a mask, forming LDD regions within the first and second semiconductor layers by using the selectively removed first and second gate electrodes as masks, forming second source and drain regions within the second semiconductor layer by heavily implanting second-type impurity ions into the second semiconductor layer by using the selectively removed second gate electrode as a mask, forming a first insulating interlayer along on the entire surface of the substrate, forming a pixel electrode on the first insulating interlayer to be overlapped with the storage capacitor electrode, forming a second insulating interlayer along the entire surface of the substrate including the pixel electrode, forming contact holes to expose a portion of the pixel electrode and portions of the first and second source and drain regions, and forming first and second source and drain electrodes electrically connected to the first and second source and drain regions and the pixel electrode through the contact holes.

In another aspect, a method for manufacturing a liquid crystal display (LCD) device includes preparing a substrate having a pixel region and a driving circuit region, forming a first semiconductor layer within the pixel region, and second and third semiconductor layers having a predetermined interval therebetween within the driving circuit region, sequentially forming a gate insulating layer, a metal layer, and a photoresist along an entire surface of the substrate including the first, second, and third semiconductor layers, forming first, second, and third gate electrodes on the gate insulating layer corresponding to the first and second semiconductor layers, and a storage capacitor electrode within the pixel region by patterning the photoresist and selectively removing the metal layer, ashing the patterned photoresist to reduce a width and thickness of the patterned photoresist, forming first, second, and third source/drain regions within the first, second, and third semiconductor layers by heavily implanting first-type impurity ions into the first and second semiconductor layers by using the first, second, and third gate electrodes as masks, selectively removing the first, second, and third gate electrodes and the storage capacitor electrode by using the ashed photoresist as a mask, forming LDD regions within the first, second, and third semiconductor layers by using the first, second, and third gate electrodes as masks, forming third source and drain regions by heavily implanting second-type impurity ions into the third semiconductor layer corresponding to opposing sides of the third gate electrode, forming a first insulating interlayer along an entire surface of the substrate, forming a pixel electrode on the first insulating interlayer to be overlapped with the storage capacitor electrode, forming a second insulating interlayer along an entire surface of the substrate including the pixel electrode, forming a plurality of contact holes to expose a portion of the pixel electrode and portions of the first, second, and third source and drain regions, and forming first, second, and third source and drain electrode electrically connected to the first, second, and third source and drain regions and the pixel electrode through the contact holes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3A:
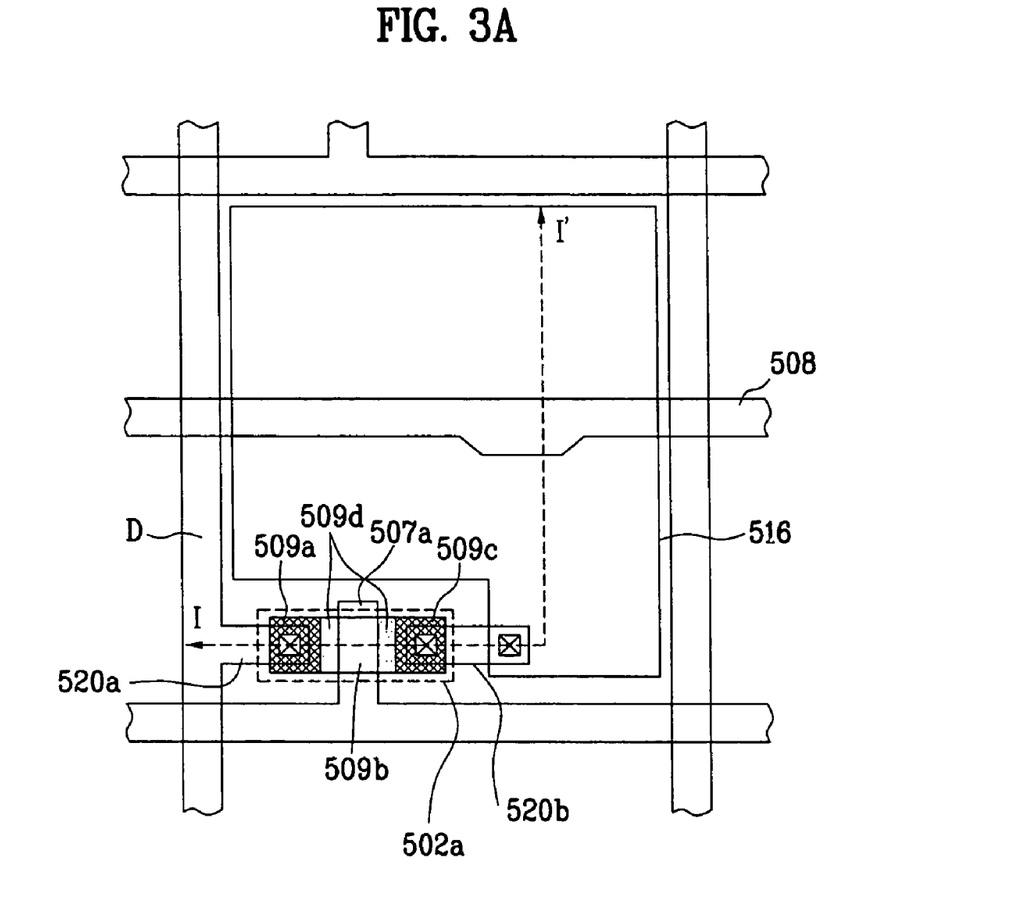
FIG. 3A is a partial plan view of an exemplary LCD device according to the present invention.
Figure 3B:
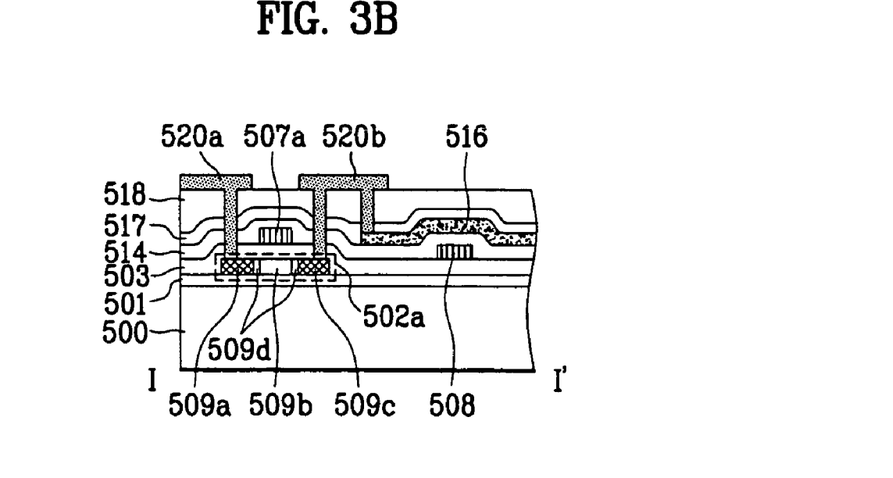
FIG. 3B is a cross sectional view along I–I' of FIG. 3A according to the present invention.
Figure 4A:
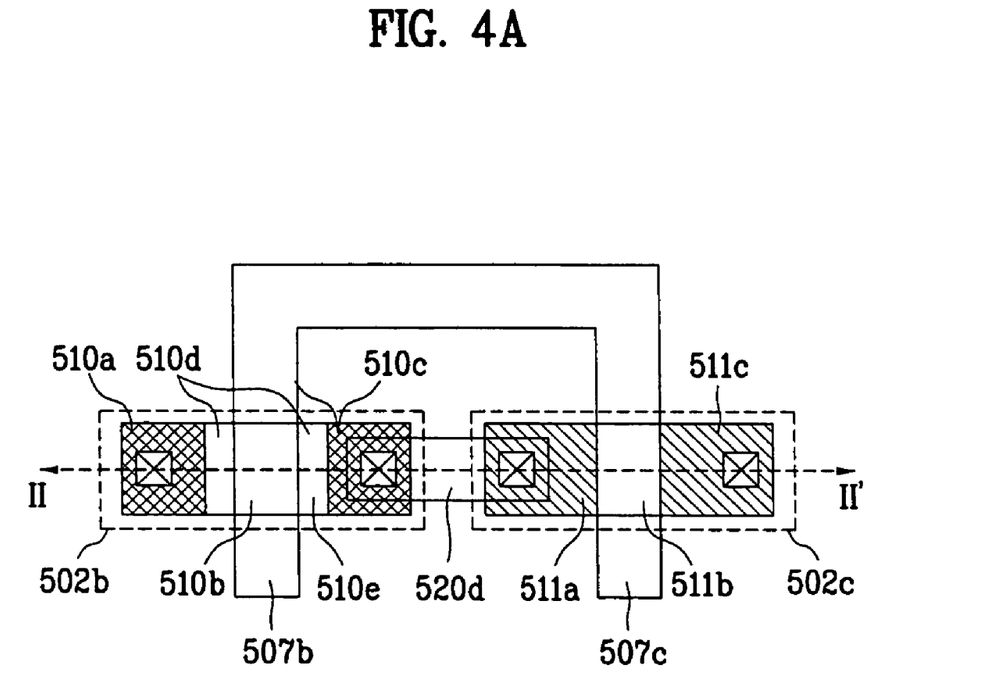
FIG. 4A is a partial plan view of another exemplary LCD device according to the present invention.
Figure 4B:
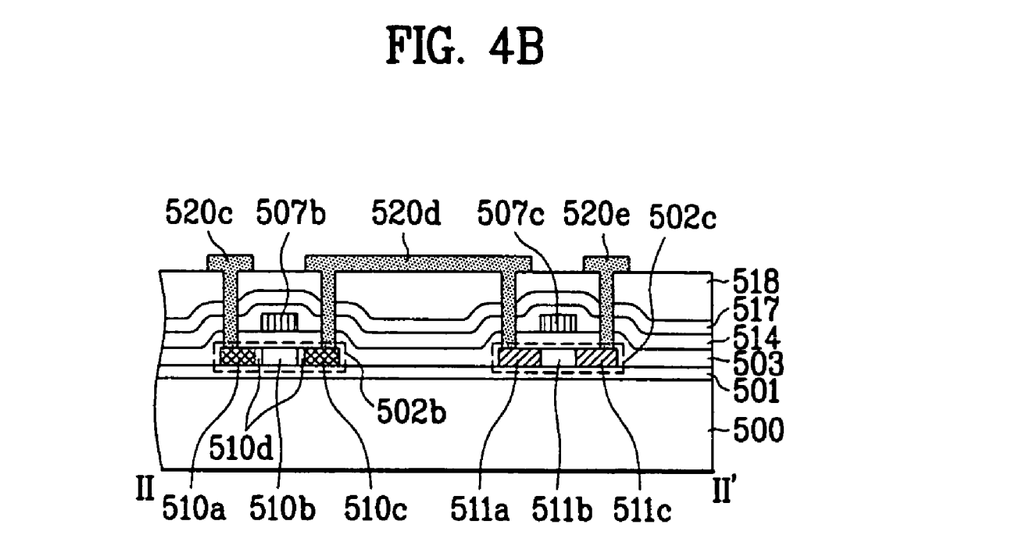
FIG. 4B is a cross sectional view along II–II' of FIG. 4A according to the present invention.

FIG. 3A is a partial plan view of an exemplary LCD device according to the present invention, and FIG. 3B is a cross sectional view along I–I' of FIG. 3A according to the present invention. FIG. 4A is a partial plan view of another exemplary LCD device according to the present invention, and FIG. 4B is a cross sectional view along II–II' of FIG. 4A according to the present invention. Accordingly, FIGS. 3A and 3B illustrate a pixel portion of the LCD device, and FIGS. 4A and 4B illustrate a driving circuit portion of the LCD device.

In FIGS. 3B and 4B, a buffer layer 501 may be formed along an entire surface of a substrate 500, first, second, and third semiconductor layers 502a, 502b, and 502c may be formed on the buffer layer 501 at fixed intervals, a gate insulating layer may be formed along an entire surface of the substrate 500 including the first, second, and third semiconductor layers 502a, 502b, and 502c, a storage capacitor electrode 508 may be formed on the gate insulating layer 503 in a pixel region, first, second, and third gate electrodes 507a, 507b, and 507c may be formed on the gate insulating layer 503 corresponding to the first, second, and third semiconductor layers 502a, 502b, and 502c, respectively, and a first insulating interlayer 514 may be formed along an entire surface of the substrate 500 including the storage capacitor electrode 508 and the first, second, and third gate electrodes 507a, 507b, and 507c. In addition, a pixel electrode 516 may be formed on the first insulating interlayer 514 to be overlapped with the storage capacitor electrode 508, a second insulating interlayer 517 may be formed along an entire surface of the substrate 500 including the pixel electrode 516, and a passivation layer 518 may be formed along an entire surface of the substrate 500 including the second insulating interlayer 517.

In FIG. 3B, first source and drain regions 509a and 509c heavily doped with n-type impurity ions and an LDD region 509d lightly doped with n-type impurity ions may be formed within the first semiconductor layer 502a corresponding to both sides of the first gate electrode 507a. Accordingly, a channel region 509b may be formed within the first semiconductor layer 502a below the first gate electrode 507a.

In FIG. 4B, second source and drain regions 510a and 510c heavily doped with n-type impurity ions and an LDD region 510d lightly doped with n-type impurity ions may be formed within the second semiconductor layer 502b corresponding to both sides of the second gate electrode 507b. Accordingly, a channel region 510b may be formed within the second semiconductor layer 502b below the second gate electrode 507b. In addition, third source and drain regions 511a and 511c heavily doped with p-type impurity ions may be formed within the third semiconductor layer 502c corresponding to both sides of the third gate electrode 507c, and a channel region 511b is formed in the third semiconductor layer 502c below the third gate electrode 507c.

In FIG. 3A, the first source region 509a of the first semiconductor layer 502a may be connected with a data line D through a first source electrode 520a formed along a contact hole, and the first drain region 509c may be connected with the pixel electrode 516 through a first drain electrode 520b along a contact hole. In FIG. 4A, the second drain region 510c of the second semiconductor layer 502b may be connected with the third source region 511a of the third semiconductor layer 502c through a second drain electrode (a third source electrode) 520d along a contact hole. In addition, the second source region 510a may be connected with a voltage power source (not shown) through a second source electrode 520c formed along a contact hole. The third drain region 511c of the third semiconductor layer 502c may be connected with a ground terminal (not shown) through a third drain electrode 520e formed along a contact hole. When the driving circuit portion is formed of pMOS TFT, the second semiconductor layer 502b may not be necessary.

Figure 5A:
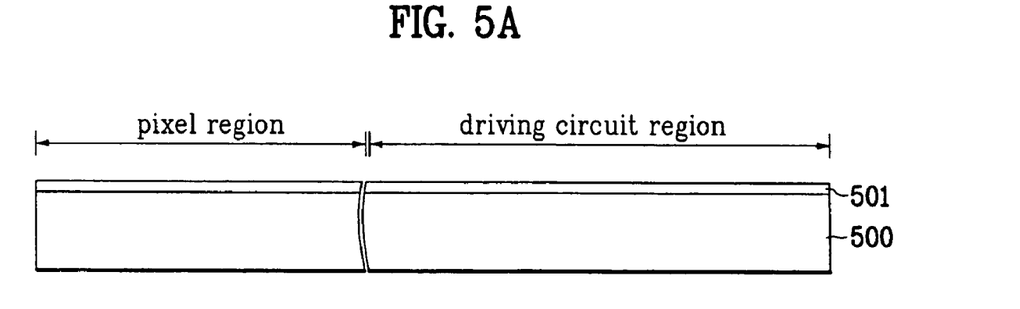
FIGS. 5A to 5P are cross sectional views of exemplary manufacturing process steps of an LCD device according to the present invention.

FIGS. 5A to 5P are cross sectional views of exemplary manufacturing process steps of an LCD device according to the present invention. In FIG. 5A, a substrate 500 having a pixel region for an n-type TFT and a driving circuit region for a CMOS TFT of n-type and p-type TFTs may be prepared. Then, a buffer layer 501 may be deposited along an entire surface of the substrate 500.

Figure 5B:
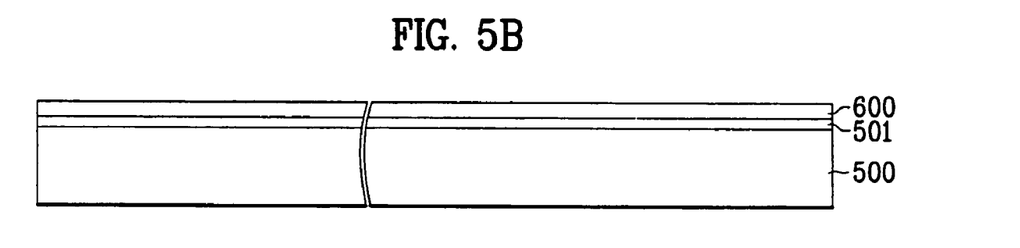

In FIG. 5B, an amorphous silicon layer 600 may be deposited along an entire surface of the substrate 500 including the buffer layer 501 at a thickness of about 550 Å.

Figure 5C:
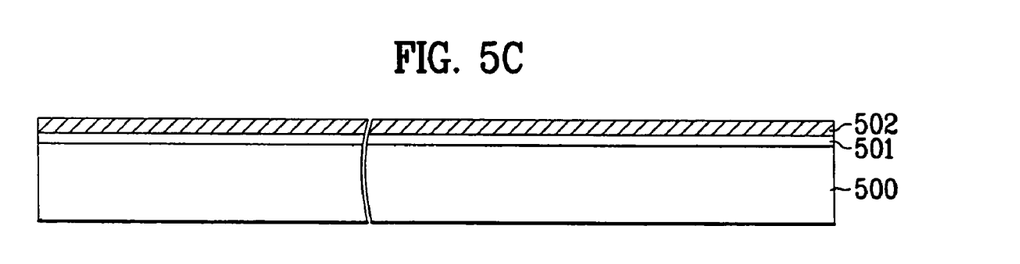

In FIG. 5C, the amorphous silicon layer 600 may be crystallized to form a polysilicon layer 502. Before crystallizing the amorphous silicon layer 600, a process for dehydrogenation may be performed to the amorphous silicon layer 600, thereby preventing void formation and improving electric characteristics of the polysilicon layer 502. A method of crystallizing the amorphous silicon layer 600 into the polysilicon layer 502 may use one of an excimer laser annealing (ELA) method, a metal induced crystallization (MIC) method, and a solid phase crystallization (SPC) method. During the ELA method, a beam of an excimer laser may be irradiated onto the amorphous silicon layer 600 while the substrate 500 is heated to a temperature of about 250° C., thereby forming the polysilicon layer 502. During the MIC method, a metal material may be deposited onto the amorphous silicon layer 600. During the SPC method, a heat treatment may be performed to the amorphous silicon layer 600 at a relatively high temperature for an extended period of time to form the polysilicon layer 600. In addition, the polysilicon layer 502 may be directly deposited onto the substrate 500, and the substrate may be heated for crystallizing the amorphous silicon layer 600 into the polysilicon layer 502. However, characteristics of the polysilicon layer 502 may be deteriorated by alkali ions (i.e., K or Na) of the substrate 500. Therefore, the buffer layer 501 may be formed to prevent the deterioration of the characteristics on the polysilicon layer 502.

Figure 5D:
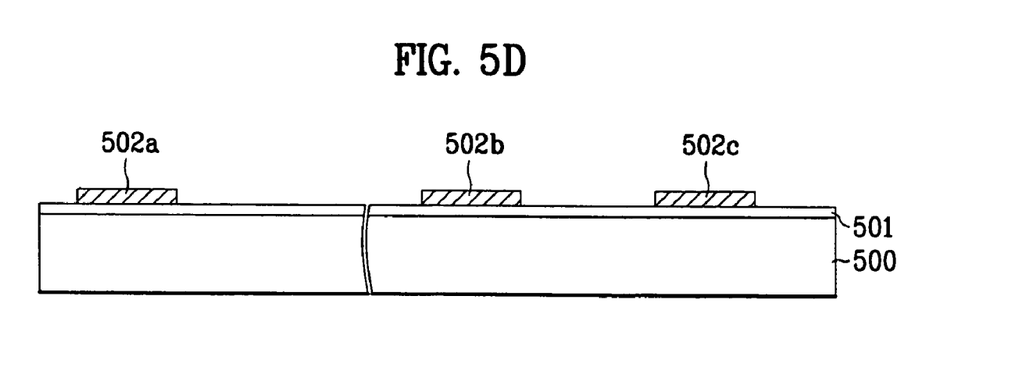

In FIG. 5D, a first photoresist (not shown) may be deposited, and then the polysilicon layer 502 may be selectively patterned by photolithographic processes, thereby forming the first semiconductor layer 502 within the pixel region of the substrate 500, and the second and third semiconductor layers 502b and 502c within the driving circuit region (the first mask).

Figure 5E:
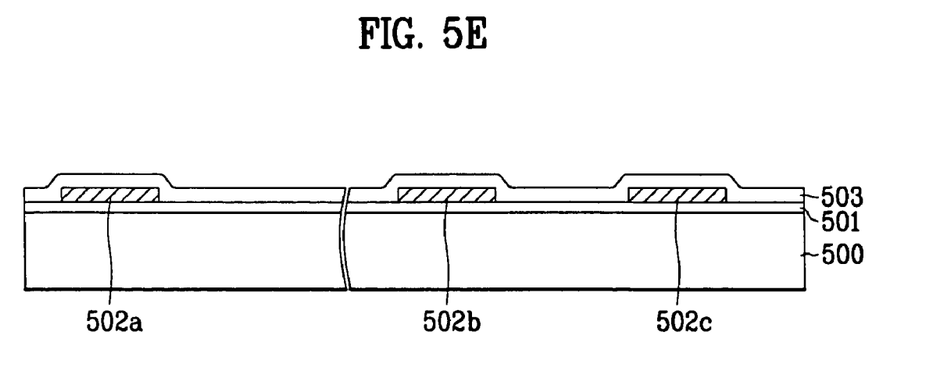

In FIG. 5E, the gate insulating layer 503 may be deposited along an entire surface of the substrate 500 including the first, second, and third semiconductor layers 502a, 502b, and 502c. Then, the gate insulating layer 503 may be formed of silicon oxide $SiO_2$ or silicon nitride $SiN_x$.

Figure 5F:
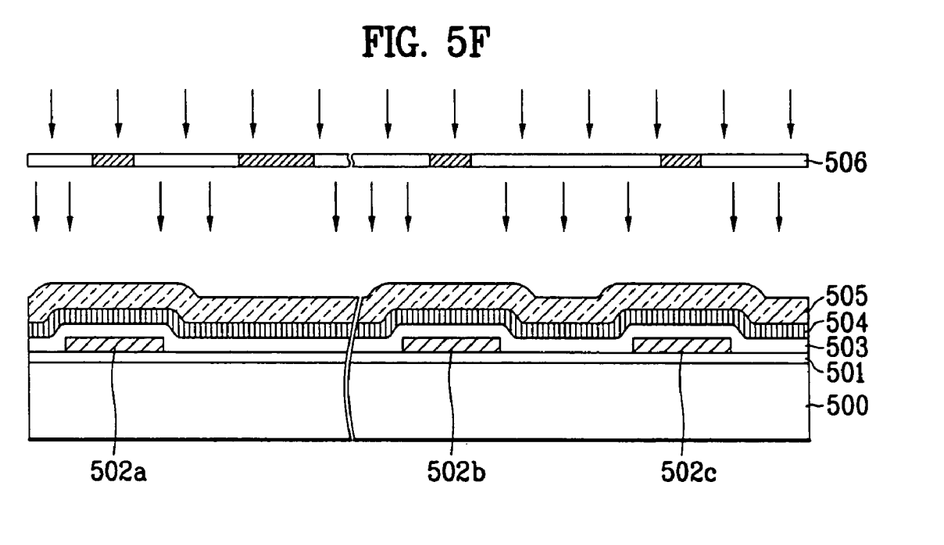

In FIG. 5F, a metal layer 504 and a second photoresist 505 may be deposited along an entire surface of the substrate 500 including the gate insulating layer 503, and then an exposure process may be performed using a mask 506 having the regions for the respective gate electrodes and the storage capacitor electrode.

Figure 5G:
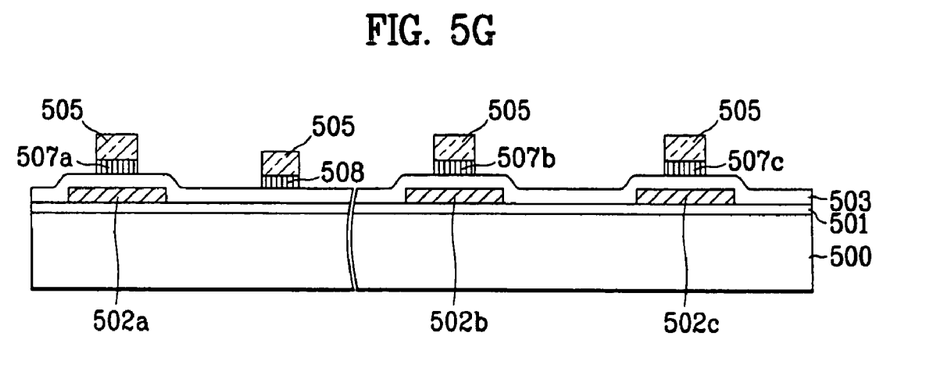

In FIG. 5G, the exposed second photoresist 505 may be developed and patterned. Then, the metal layer 504 may be selectively removed by using the patterned second photoresist 505 as a mask, thereby forming the storage capacitor electrode 508 on the gate insulating layer 503 within the pixel region, and the first, second, and third gate electrodes 507a, 507b, and 507c on the gate insulating layer 503 corresponding to the first, second, and third semiconductor layers 502a, 502b, and 502c, respectively.

Figure 5H:
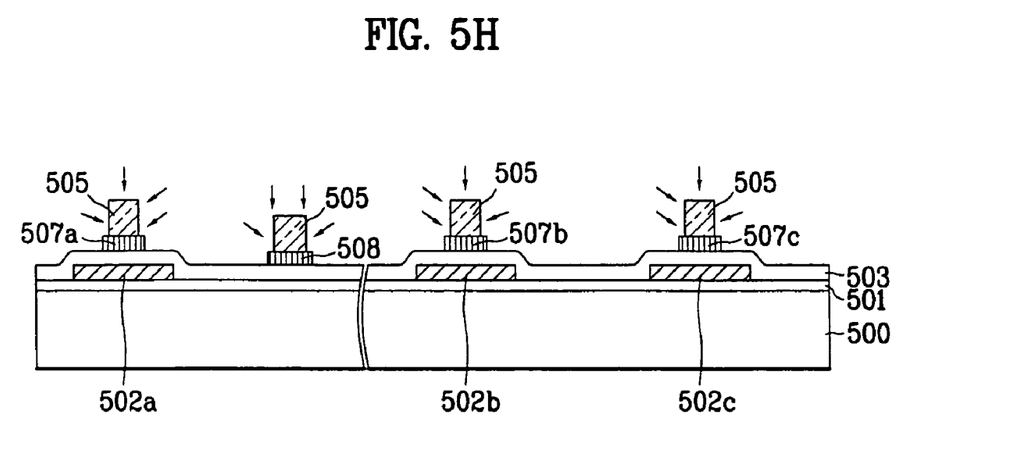

In FIG. 5H, a width of the patterned photoresist 505 may be reduced by ashing the patterned second photoresist 505. The ashing process may be simultaneously performed to the upper side and the left and right sides of the second photoresist 505, thereby decreasing a thickness and width of the second photoresist 505. Accordingly, it may be necessary to perform the ashing process to the left and right sides of the patterned second photoresist 505, since the left and right sides of the patterned second photoresist 505 are ashed in correspondence with a size of the LDD regions 509d and 510d (in FIG. 5K) in the first and second semiconductor layers 502a and 502b. For example, for selectively implanting the lightly doped n-type impurity ions (n⁻) into the LDD regions 509d and 510d (in FIG. 5K) adjacent to the both sides of the respective channel regions 509b and 510b (in FIG. 5K) of the first and second semiconductor layers 502 and 502b, the left and right sides of the second photoresist 505 are ashed in correspondence with the size of the LDD regions 509d and 510d (in FIG. 5K). In addition, the patterned second photoresist 505 on the third semiconductor layer 502c and the storage capacitor electrode 508 may be ashed simultaneously.

Figure 5I:
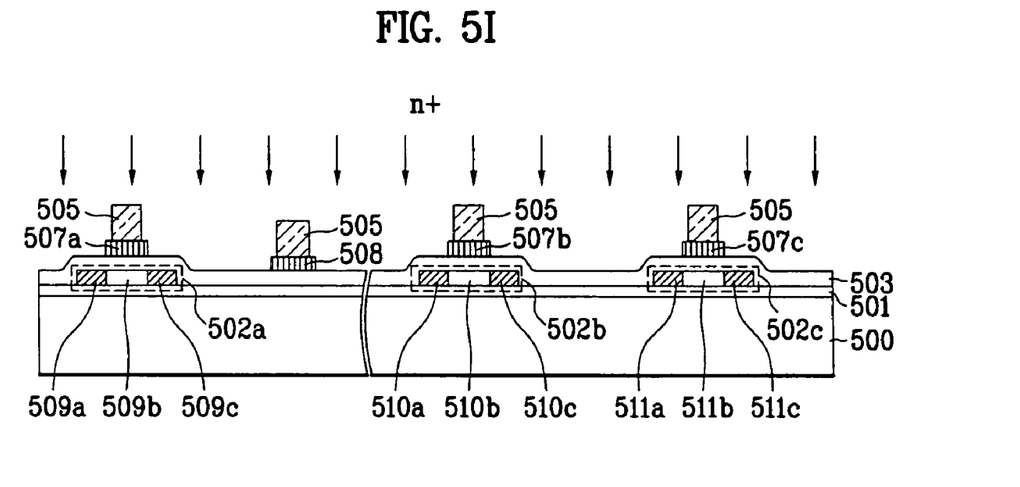

In FIG. 5I, the heavily doped n-type impurity ions (n⁺) may be implanted into an entire surface of the substrate 500 by using the first, second, and third gate electrodes 508a, 507b, and 507c as masks, thereby forming the first source and drain regions 509a and 509c, the second source and drain regions 510a and 510c, and the third source and drain regions 511a and 511c in the first, second, and third semiconductor layers 502a, 502b, and 502c.

Figure 5J:
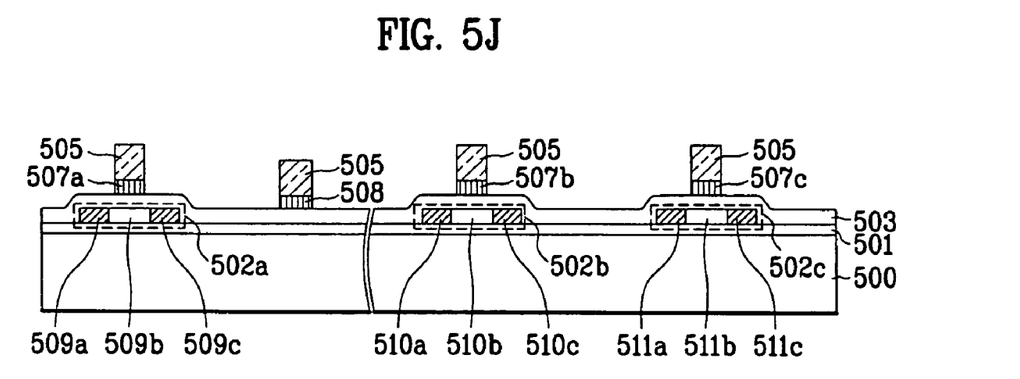

In FIG. 5J, exposed portions of the first, second, and third gate electrodes 507a, 507b, and 507c may be etched by using the ashed second photoresist 505 as a mask. Thus, exposed portions of the storage capacitor electrode 508 may be simultaneously etched. The etching process may include one of a wet etching and a dry etching method.

Figure 5K:
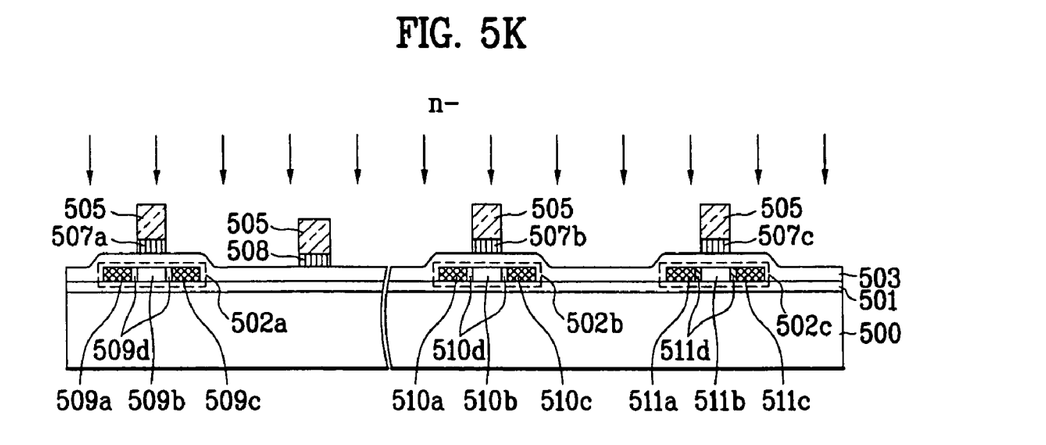

In FIG. 5K, the lightly doped n-type impurity ions (n⁻) may be implanted into the exposed portions of the first, second, and third semiconductor layers 502a, 502b, and 502c by using the etched first, second, and third gate electrodes 507a, 507b, and 507c as masks, thereby forming the LDD regions 509d, 510d, and 511d. Thus, the respective source and drain regions 509a, 510a, 511a, and 509c, 510c, and 511c of the semiconductor layers 502a, 502b, 502c may be heavily doped with the n-type impurity ions (n⁺). Accordingly, although the lightly doped n-type impurity ions (n⁻) are implanted into the respective source and drain regions, the respective source and drain regions may be maintained as heavily doped with n-type impurity ions (n⁺).

Figure 5L:
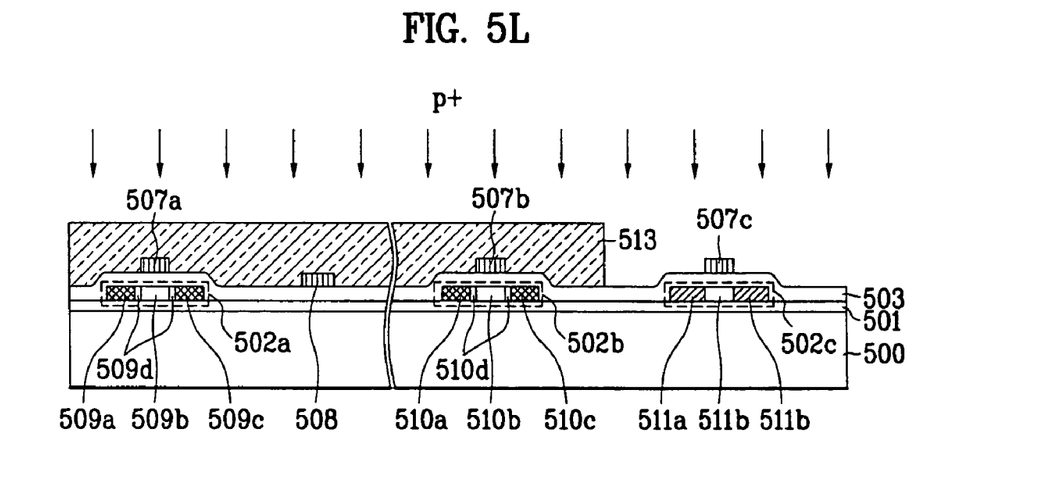

In FIG. 5L, after removing the ashed second photoresist 505, a third photoresist 513 may be formed along an entire surface of the substrate 500, and then patterned to cover the entire substrate 500, except for the third semiconductor layer 502c, by photolithographic processes (the third mask). Then, the heavily doped p-type impurity ions (p⁺) may be implanted into an entire surface of the substrate 500 by using the patterned third photoresist 513 as a mask, whereby the third source and drain regions 511a and 511c and the LDD region 511d of the third semiconductor layer 502c corresponding to the both sides of the gate electrode 507c may be heavily doped with the p-type impurity ions (p⁺). In addition, the third source and drain regions 511a and 511c of the third semiconductor layer 502c and the LDD region 511d may be respectively doped with the heavily doped n-type impurity ions and the lightly doped n-type impurity ions. However, during the counter-doping method of implanting the heavily doped p-type impurity ions (p⁺) having a higher concentration than that of the heavily doped n-type impurity ions (n⁺), the third source and drain regions 511a and 511c and the LDD region 511d may be heavily doped with the p-type impurity ions. Accordingly, the third source and drain regions 511a and 511c of the third semiconductor layer 502c may be heavily doped with the p-type impurity ions (p⁺). Accordingly, the LDD region 511d of the third semiconductor layer 502c may be counter-doped with the heavily doped p-type impurity ions, whereby the LDD region 511d of the third semiconductor layer 502c may be formed with the third source and drain regions 511a and 511c.

Figure 5M:
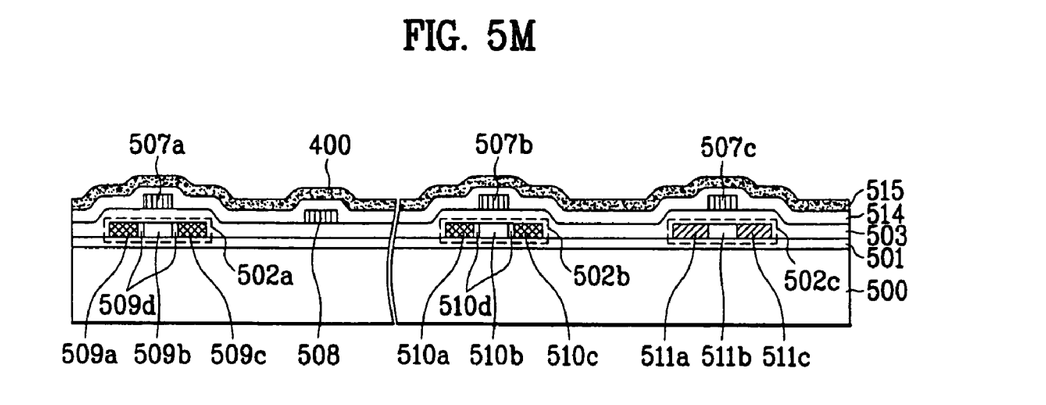

In FIG. 5M, the third photoresist 513 may be removed. Then, the first insulating interlayer 514 and a conductive layer 515 may be sequentially formed along an entire surface of the substrate 500 including the first, second, and third gate electrodes 507a, 507b, and 507c and the storage capacitor electrode 508.

Figure 5N:
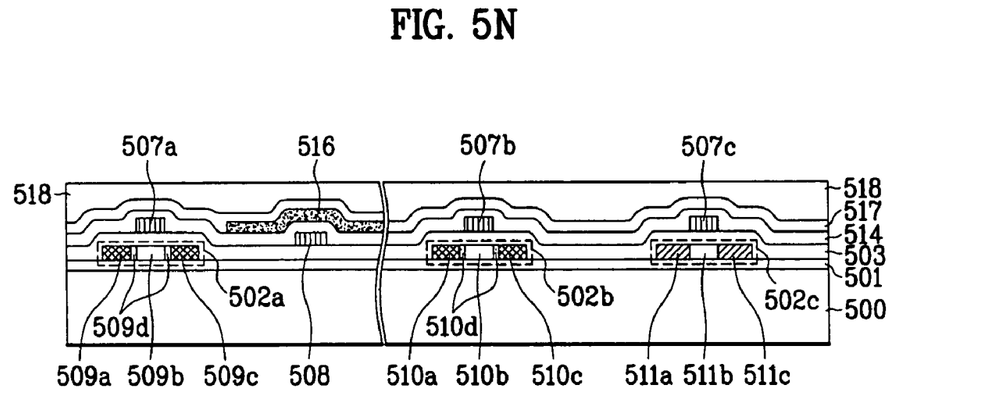

In FIG. 5N, a fourth photoresist (not shown) may be formed on the conductive layer 515, and then selectively patterned by photolithographic processes, thereby forming the pixel electrode 516 to be overlapped with the storage capacitor electrode 508 (the fourth mask). Then, the second insulating interlayer 517 and the passivation layer 518 may be sequentially formed along an entire surface of the substrate 500 including the pixel electrode 516. Accordingly, the pixel electrode 516 may be formed to completely cover the storage capacitor electrode 508. Thus, the first insulating interlayer 514 between the pixel electrode 516 and the storage capacitor electrode 518 overlapped with the pixel electrode 516 may function as the storage capacitor. In addition, the first and second insulating interlayers 514 and 517 may be formed of silicon oxide $SiO_2$ layers, and the conductive layer 515 may be formed of a transparent conductive layer, such as indium-tin-oxide (ITO). For example, the pixel electrode 516 may be formed of a transparent conductive layer since the pixel electrode 516 may be formed during patterning of the conductive layer 515. Thus, the first insulating interlayer 514, between the pixel electrode 516 and the storage capacitor electrode 508, may be formed at a thickness of about 100 Å to about 2000 Å, or about 100 Å to about 1000 Å.

Figure 5O:
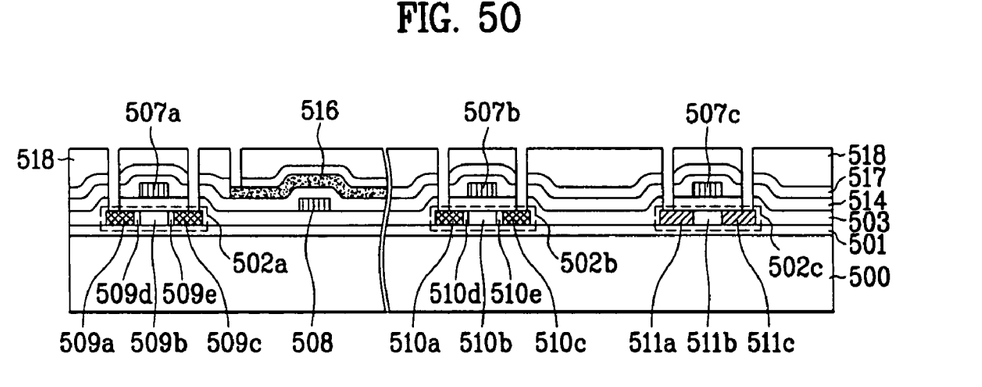

In FIG. 5O, a fifth photoresist (not shown) may be formed on the passivation layer 518. Then, the gate insulating layer 503, the first insulating interlayer 514, the second insulating interlayer 517, and the passivation layer 518 may be selectively patterned by photolithographic processes, thereby forming the contact holes for exposing the respective first, second, and third source and drain regions 509a, 510a, and 511a, and 509c, 510c, and 511c of the first, second, and third semiconductor layers 502a, 502b, and 502c (the fifth mask).

Figure 5P:
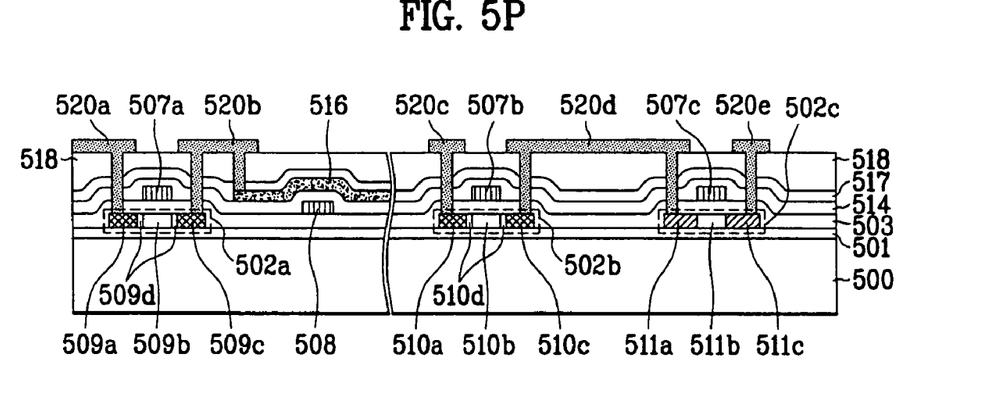

In FIG. 5P, a metal layer and a sixth photoresist (not shown) may be sequentially formed along an entire surface of the substrate 500, and then selectively patterned by photolithographic processes, thereby simultaneously forming the first source and drain electrodes 520a and 520b, the second source and drain electrodes 520c and 520d, and the third source and drain electrodes 520d and 520e (the sixth mask). Accordingly, the first source electrode 520a of the pixel region may project (i.e., extend) from the data line D (in FIG. 3A). In addition, the first source electrode 520a may be connected with the first source region 509a through the contact hole, and the first drain electrode 520b may be connected with the first drain region 509c and the pixel electrode 516 through the contact hole. Similarly, the second source electrode 520c of the driving circuit region may be connected with the second source region 510a through the contact hole, and the second drain electrode (the third source electrode) 520d may be connected with the second drain region 510c and the third source region 512a through the contact hole.

According to the present invention, the pixel region may form the n-type TFT including the first semiconductor layer 502a and the first gate electrode 507a. Then, the driving circuit region may form the CMOS TFT of the n-type TFT and the p-type TFT, the n-type TFT including the second semiconductor layer 502b and the second gate electrode 507b, and the p-type TFT including the third semiconductor layer 502c and the third gate electrode 507c. Thus, the pixel region may further include the storage capacitor (the first insulating interlayer 514) between the storage capacitor electrode 508 and the pixel electrode 516.

If the driving circuit region comprises only pMOS, the second semiconductor layer may not be necessary. In FIGS. 5A to 5P, the second semiconductor layer and the process for forming the same are omitted without explanation for when the driving circuit region comprises only pMOS.

According to the present invention, an LCD device and the method for manufacturing an LCD device has the following advantages. First, since the LDD regions are formed in any one of the n-type TFT and the p-type TFT for the CMOS TFT of the driving circuit region, leakage voltage may be reduced. In addition, the LCD device according to the present invention may be manufactured using 6 masks, thereby reducing manufacturing costs and simplifying the manufacturing processes. Moreover, the storage capacitor electrode and the gate electrode may be simultaneously formed during patterning of the gate electrode. For example, since the storage capacitor electrode may be formed of the metal material, capacity of capacitor may be increased.

It will be apparent to those skilled in the art that various modifications and variations can be made in the LCD device and the method of manufacturing an LCD device of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
a substrate including a pixel region and a driving circuit region;
first and second semiconductor layers disposed within the pixel region and the driving circuit region of the substrate;
a gate insulating layer disposed along an entire surface of the substrate including the first and second semiconductor layers;
first and second gate electrodes disposed on the gate insulating layer corresponding to the first and second semiconductor layers, and a storage capacitor electrode on the gate insulating layer within the pixel region;
first conductive source and drain regions each having LDD structures within the first semiconductor layer corresponding to opposing sides of the first gate electrode;
second conductive source and drain regions within the second semiconductor layer corresponding to opposing sides of the second gate electrode;
a first insulating interlayer disposed along an entire surface of the substrate including the first and second gate electrodes and the storage capacitor electrode;
a pixel electrode disposed directly on the first insulating interlayer within the pixel region, and being overlapped with the storage capacitor electrode;
a second insulating interlayer disposed along an entire surface of the substrate including the pixel electrode;
a plurality of contact holes exposing a portion the pixel electrode and portions of the first and second source and drain regions; and
first and second source and drain electrodes connected with the first and second source and drain regions through the contact holes.

2. The device according to claim 1, wherein the first drain electrode interconnects the first drain electrode with the pixel electrode.

3. The device according to claim 1, wherein the first and second semiconductor layers are formed of polysilicon.

4. The device according to claim 1, wherein the pixel electrode is formed of a transparent conductive layer.

5. The device according to claim 1, wherein the first insulating interlayer is formed at a thickness between about 100 Å and about 1000 Å.

6. A liquid crystal display (LCD) device, comprising:
a substrate having a pixel region and a driving circuit region;
a first semiconductor layer within the pixel region of the substrate, and second and third semiconductor layers within the driving circuit region of the substrate;
a gate insulating layer disposed along an entire surface of the substrate including the first, second, and third semiconductor layers;
first, second, and third gate electrodes on the gate insulating layer corresponding to the first, second, and third semiconductor layers, and a storage capacitor electrode on the gate insulating layer within the pixel region;
first and second source and drain regions of a first conductive type each having LDD structures within the first and second semiconductor layers corresponding to opposing sides of the respective first and second gate electrodes;
third conductive source and drain regions of a second conductive type within the third semiconductor layer corresponding to opposing sides of the third gate electrode;
a first insulating interlayer disposed along an entire surface of the substrate including the first, second, and third gate electrodes and the storage capacitor electrode;
a pixel electrode disposed directly on the first insulating interlayer within the pixel region to be overlapped with the storage capacitor electrode;
a second insulating interlayer disposed along an entire surface of the substrate including the pixel electrode;
a plurality of contact holes exposing a portion of the pixel electrode and portions of the first, second, and third source and drain regions; and
first, second, and third source and drain electrodes connected with the first, second, and third source and drain regions through the contact holes.

7. The device according to claim 6, wherein the first drain electrode interconnects the first drain region with the pixel electrode.

8. The device according to claim 6, wherein the first, second, and third semiconductor layers are formed of polysilicon.

9. The device according to claim 6, wherein the pixel electrode is formed of a transparent conductive layer.

10. The device according to claim 6, wherein the first insulating interlayer is formed at a thickness between about 100 Å and about 1000 Å.

11. The device according to claim 6, wherein the second drain electrode is integrated with the third source electrode to electrically interconnect the second drain region with the third source region.

12. A method for manufacturing a liquid crystal display (LCD) device, comprising:
forming first and second semiconductor layers on a substrate having a pixel region and a driving circuit region;
sequentially forming a gate insulating layer, a metal layer, and a photoresist along an entire surface of the substrate including the first and second semiconductor layers;
forming first and second gate electrodes on the gate insulating layer corresponding to the first and second semiconductor layers, and a storage capacitor electrode within the pixel region by patterning the photoresist and selectively removing the metal layer;
ashing the patterned photoresist to reduce a width and thickness of the patterned photoresist;
forming first source and drain regions within the first and second semiconductor layers by heavily implanting first conductive type impurity ions into the first and second semiconductor layers by using the first and second gate electrodes as masks;
selectively removing the first and second gate electrodes and the storage capacitor electrode by using the ashed photoresist as a mask;
forming LDD regions within the first and second semiconductor layers by using the selectively removed first and second gate electrodes as masks;
forming second source and drain regions within the second semiconductor layer by heavily implanting second-type impurity ions into the second semiconductor layer by using the selectively removed second gate electrode as a mask;
forming a first insulating interlayer along on the entire surface of the substrate;
forming a pixel electrode directly on the first insulating interlayer to be overlapped with the storage capacitor electrode;
forming a second insulating interlayer along the entire surface of the substrate including the pixel electrode;
forming contact holes to expose a portion of the pixel electrode and portions of the first and second source and drain regions; and
forming first and second source and drain electrodes electrically connected to the first and second source and drain regions and the pixel electrode through the contact holes.

13. The method according to claim 12, wherein the first and second semiconductor layers are formed of polysilicon.

14. The method according to claim 12, wherein the pixel electrode is formed of a transparent conductive layer.

15. The method according to claim 12, wherein the first insulating interlayer is formed at a thickness between about 100 Å and about 1000 Å.

16. The method according to claim 12, wherein the first drain electrode electrically interconnects the first drain region with the pixel electrode.

17. The method according to claim 12, wherein the second source and drain regions are formed by counter-doping with the second-type impurity ions.

18. A method for manufacturing a liquid crystal display (LCD) device, comprising:
preparing a substrate having a pixel region and a driving circuit region;
forming a first semiconductor layer within the pixel region, and second and third semiconductor layers having a predetermined interval therebetween within the driving circuit region;
sequentially forming a gate insulating layer, a metal layer, and a photoresist along an entire surface of the substrate including the first, second, and third semiconductor layers;
forming first, second, and third gate electrodes on the gate insulating layer corresponding to the first and second semiconductor layers, and a storage capacitor electrode within the pixel region by patterning the photoresist and selectively removing the metal layer;
ashing the patterned photoresist to reduce a width and thickness of the patterned photoresist;

forming first, second, and third source/drain regions within the first, second, and third semiconductor layers by heavily implanting first-type impurity ions into the first and second semiconductor layers by using the first, second, and third gate electrodes as masks;

selectively removing the first, second, and third gate electrodes and the storage capacitor electrode by using the ashed photoresist as a mask;

forming LDD regions within the first, second, and third semiconductor layers by using the first, second, and third gate electrodes as masks;

forming third source and drain regions by heavily implanting second-type impurity ions into the third semiconductor layer corresponding to opposing sides of the third gate electrode;

forming a first insulating interlayer along an entire surface of the substrate;

forming a pixel electrode directly on the first insulating interlayer to be overlapped with the storage capacitor electrode;

forming a second insulating interlayer along an entire surface of the substrate including the pixel electrode;

forming a plurality of contact holes to expose a portion of the pixel electrode and portions of the first, second, and third source and drain regions; and forming first, second, and third source and drain electrode electrically connected to the first, second, and third source and drain regions and the pixel electrode through the contact holes.

19. The method according to claim 18, wherein the first drain electrode interconnects the first drain region with the pixel electrode.

20. The method according to claim 18, wherein the first, second, and third semiconductor layers are formed of polysilicon.

21. The method according to claim 18, wherein the pixel electrode is formed of a transparent conductive layer.

22. The method according to claim 18, wherein the first insulating interlayer is formed at a thickness between about 100 Å and about 1000 Å.

23. The method according to claim 18, wherein the second drain electrode is integrated with the third source electrode to electrically interconnect the second drain region having the first conductive type with the third source region having the second conductive type.

24. The method according to claim 18, wherein the third source and drain regions are formed by counter-doping with the second-type impurity ions.

* * * * *